United States Patent [19]

Bruder

[11] Patent Number: 5,757,950
[45] Date of Patent: May 26, 1998

[54] PROCESS FOR THE CUTTING OR STAMPING OF INDIVIDUAL PARTS FROM AN ANIMAL SKIN

[75] Inventor: Wolfgang Bruder, Bielefeld, Germany

[73] Assignee: Dürkoff Adler AG, Bielefeld, Germany

[21] Appl. No.: 660,338

[22] Filed: Jun. 21, 1996

[30] Foreign Application Priority Data

Jun. 22, 1995 [DE] Germany ............ 195 22 717.4

[51] Int. Cl.⁶ .................. G06K 9/00; G05B 19/18; G06F 19/00
[52] U.S. Cl. .............. 382/111; 364/470.05; 364/474.13
[58] Field of Search .................. 83/360–65, 39, 83/49, 56, 936, 939; 235/462; 348/88; 356/238; 364/470.01–470.03, 470.05, 470.06, 474.13, 507; 382/111, 294

[56] References Cited

U.S. PATENT DOCUMENTS 4,941,183  7/1990  Bruder et al. .................. 382/111

FOREIGN PATENT DOCUMENTS 3627110  8/1989  Germany.

*Primary Examiner*—Joseph Mancuso
*Assistant Examiner*—Marc Bobys
*Attorney, Agent, or Firm*—Ostrolenk, Faber, Gerb & Soffen, LLP

[57] ABSTRACT

A process for cutting or stamping individual parts from an animal skin in which the contours of the individual parts are stored in a computer and can be assembled to form a cutting pattern, and, for optimizing the cutting, the cutting pattern is established individually as a function of the quality of the skin and is projected by a projection device onto the skin, with which the advantages of large-area nesting can be combined with the advantages of small-area cutting or stamping.

14 Claims, 1 Drawing Sheet

PROCESS FOR THE CUTTING OR STAMPING OF INDIVIDUAL PARTS FROM AN ANIMAL SKIN

BACKGROUND OF THE INVENTION

1. Field of the Invention

The present invention relates to a process for cutting or stamping individual parts from an animal skin or material in which the contours of the individual parts are stored in a computer and can be assembled to form a cutting pattern. More specifically, the present invention relates to an optimized cutting process whereby the cutting pattern is projected by a projection device onto the skin, and the cuts to be made are individually established as a function of the quality of the skin.

2. Description of the Related Art

A skin-cutting process is disclosed in co-owned U.S. Pat. No. 4,941,183, the disclosure of which is incorporated herein by reference. According to the known method, the individual contours of the parts to be cut out are entered and stored in a computer. The operator can call up the contours individually and display them in all combinations on a display monitor. Via an electronic projector, the contours that have been displayed on the computer monitor also can be projected, in original size, onto the animal skin that is spread out on a table. The operator can interactively establish the cutting pattern of the individual pieces with due consideration of the defective places in the animal skin to be cut.

A complete animal skin or pelt can have a size of up to 3×3 meters. Cutting or stamping tables must be structured accordingly if work is to be carried out on the complete skin. Working from the complete skin would have certain advantages. For example, establishing the cutting pattern and, therefore, arranging the parts to be cut or stamped out on the skin (which is known generally as "nesting") can be carried out on the basis of the limiting conditions determined by the complete skin.

The different defective places present in a piece of leather, for example, such as holes, scars, cracks, differences in color, etc., influence the quality of the final product. Thus, certain defects can be tolerated on certain parts to be cut or stamped out, whereas other defects (for instance holes) cannot be accepted, or can be accepted only in certain regions of a part, because, for example, they will no longer be visible on the final product. Similarly, advantage can be taken of various markings or shadings of the material by appropriate matching of the pieces to be formed.

From these limiting conditions, which must be considered during nesting, it follows that fully optimizing the degree of utilization, i.e., the ratio of the area of the skin to the area of the realizable cutting pattern, is only possible if the entire skin is nested.

As a result of the investment costs that are involved in the purchase of cutting or stamping installations, however, small installations frequently are used. An entire skin cannot be worked on these smaller installations. The skin therefore must be divided into smaller workpieces, corresponding to the size of the installation employed. The degree of utilization achieved upon nesting using a skin divided prior to nesting naturally decreases, due to the fact that, in each part, good regions remain which are too small to accommodate cover the corresponding contour of a part to be cut out.

SUMMARY OF THE INVENTION

The present invention overcomes the problems in the prior art noted above by providing a process for cutting or stamping which makes it possible to optimize the obtainable degree of utilization even if the animal skin to be cut or stamped must first be divided prior to cutting.

The method involves the following process steps:

Providing of the skin with a machine-readable code;

Noting the contour of the complete skin and of the defective places contained in it using a camera and storing information related to the contour and the defects in a computer which is connected to the camera;

Calculating the area of the skin within the contour noted;

Displaying the contour and the defective places on a picture screen which is connected to the computer, and establishing the individual cutting pattern;

Associating the information detected and the cutting pattern established with the code arranged on the skin;

Projecting the cutting pattern on the skin using a projection device;

Dividing the skin approximately at its center by dividing the skin into workpieces sized appropriately for the cutting or stamping table, the course of the dividing cut being determined by the computer with consideration of the cutting pattern and being displayed via the projection device;

Projecting the peripheral line of each workpiece resulting from the originally detected contour and the dividing line or lines on the cutting or stamping table;

Arranging the workpieces to be cut or stamped along the peripheral line projected on the cutting or stamping table; and, Cutting or stamping on the basis of the cutting pattern.

By the process of the present invention, the advantages of full-area nesting and partial-area cutting or stamping are combined. The nesting process, and the cutting or stamping process, can take place at different places and at different times. As a result of the complete skin being nested as a whole, the degree of utilization can be fully optimized.

Advantageously, the dividing lines that separate the skin into workpieces can be determined by means of the computer. When calculating the dividing line, the computer can take the predetermined, optimal cutting pattern into account. The dividing line is drawn to avoid severing any of the nested parts. To make the subdividing cut, the dividing line is projected by the projection device on the skin so that the operator can divide the skin, for example, with the use of a traditional cutting knife. The course of the cut in this connection is, as a general rule, not a straight lines, and may be jagged or curved at various places to obtain the optimal result.

Prior to subdividing the complete skin into workpieces, the cutting pattern established and projected onto the skin preferably is interactively directed by the operator, and the corrected cutting pattern is stored in the computer. In this way, even minor defects such as, for instance, differences in color, that cannot be readily identified by the camera, can be taken into account by the operator.

In a preferred embodiment, the defective places are located by the operator and marked for camera detection. Marking can be done, for instance, by circling the defective area with a suitable contrasting string so as to avoid damaging, in particular, very fine leather by ink or crayon.

In order that the operator can concentrate fully on completing the dividing cut, the cutting pattern can be blanked out during the projection of the dividing cut pattern.

Each subdivided workpiece of the skin is individually identified for the computer, preferably on the basis of machine-readable computer coding provided on each workpiece. After the code has been scanned or entered into the computer, each piece of the subdivided skin can be associated with its cutting pattern simply by correlating the code on the workpiece with the stored computer code. Accordingly, the workpieces can be worked in any desired sequence.

Once the smaller workpieces have been cut out, the peripheral line of the piece to be cut or stamped out is projected onto the cutting or stamping table so that the operator can arrange the workpiece along the projected line. The subsequent cutting or stamping out of the desired parts from the workpieces can be carried out by, for example, a computer numerically controlled (CNC) system, or conventionally, i.e., by cutters guided manually along the cutting patterns which are then to be projected, or after the applying of dies on the projected cutting patterns.

By the process of the invention, it is possible to effect the preliminary layout work on the complete skin, which must be performed by trained personnel, and shift the actual cutting to a separate manufacturing operation. The manufacturing operation may be located in a nearby plant, or in a different country, depending on the structure of the operation.

In addition to obtaining a high degree of utilization, the smaller workpieces that can be produced by the present invention are advantageous from an ergonomic perspective. For example, handling the smaller pieces is easier, and the workpieces can be adapted to the reach of the human hand for manual cutting. Parts of smaller dimensions also are of less weight so that lifting, straightening, and transporting are facilitated.

The overall process has the particular advantage that the nesting and cutting or stamping can be effected at different places or at different times. Accordingly, an entire month's production can first of all be nested and the nested skin halves suitably stored. The larger the number of skins to be nested, the higher the quality which can be expected of the final product, since a large number of skins which correspond to each other in color for instance can be cut or stamped so that no differences in color occur in the leather fittings or vehicle upholstery subsequently produced.

Other features and advantages of the present invention will become apparent from the following description of the invention which refers to the accompanying drawings.

BRIEF DESCRIPTION OF THE DRAWINGS

The process of the invention will be described in further detail below with reference to the accompanying drawings, in which.

DETAILED DESCRIPTION OF THE PREFERRED EMBODIMENTS

Figure 1:
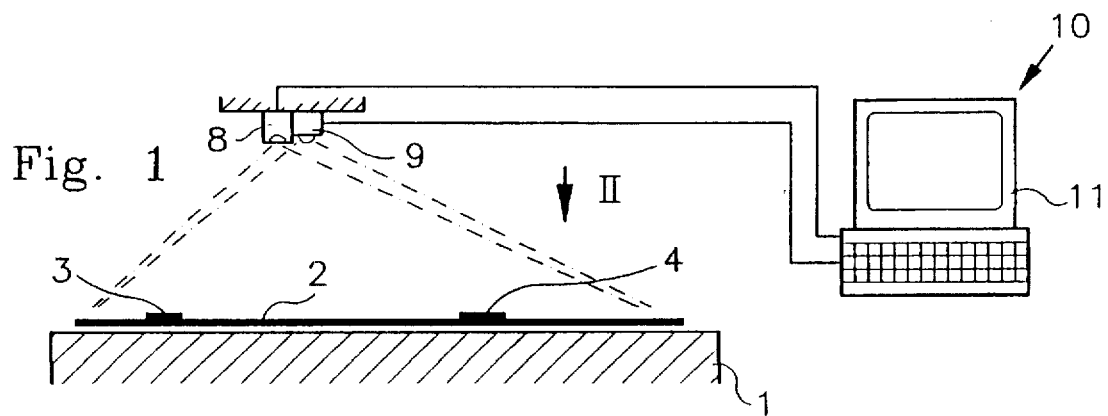
FIG. 1 shows an arrangement for nesting according to a preferred embodiment of the present invention.

Referring to FIG. 1, an animal skin 2 is laid and spread out on a table 1. Above the table 1 there are a camera 9 and a projector 8, both of which are connected to a computer 10 having a display screen 11. Within the computer 10, contour data of individual parts 7 to be cut or stamped out from the skin 2 are stored in a known manner.

For the identification of the skin 2, two bar codes 5a, 5b are pasted on the skin 2. The camera 9 arranged above table 1 images the contour 2' of the skin 2 and the defective places 3, 4 present in or on it. At the same time, the bar codes 5a, 5b can be scanned by the camera 9 and entered with the data concerning the contour 2' and the defective places 3, 4 in the computer 10. The image is displayed on screen 11.

In order to make the defective places 3, 4 clearly recognizable by the camera, they are previously suitably marked by an operator. Such a marking is effected preferably by a contrast-rich string which is placed around the defective area. At the same time, the nature of the defect can be characterized and the characterization data can be stored in the computer. Characterization information can be supplied automatically, as recognized by the computer, or manually, as recognized by the operator, for example.

The cutting pattern is established in the computer by an optimized arrangement of the parts 7 corresponding to the contour 2' noted, and the detected defective places 3, 4 and their quality. The arrangement is shown on the display screen 11 together with the reproduction of the skin 2. At the same time, the cutting pattern which has been established is projected onto the skin 2 by the projector 8, preferably a laser projector, which is connected with the computer 10. An operator can interactively control the projected cutting pattern and shift the projected contours of the parts 7 for further optimizing of the degree of utilization. The optimized cutting pattern is then stored in the computer 10.

For determining the degree of utilization, the area of the skin must be determined, which can be effected in the computer via the stored peripheral contour of the complete skin. The area of the individual partial contours stored in the computer is known. Accordingly, it is possible to calculate the total area of the cutting which can be obtained, so that the degree of utilization can be ascertained. Advantageously, the obtainable degree of utilization is displayed continuously on the screen 11 so that the operator receives a response as to whether the degree of utilization has actually been optimized, and whether a sufficient degree of utilization has been obtained, for determining whether further optimizing work is required.

Figure 2:
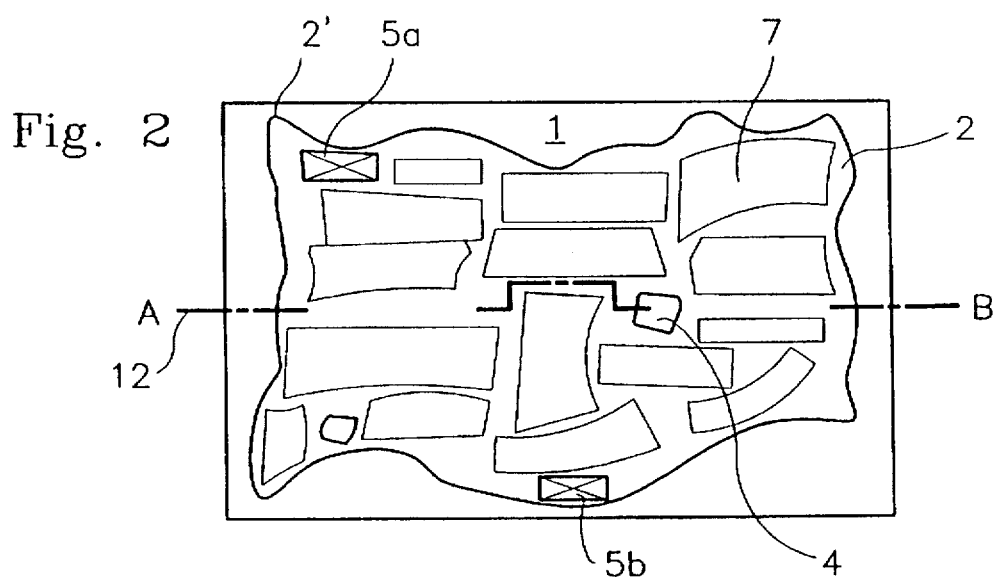
FIG. 2 shows the projected cutting pattern on the skin as seen in the direction of the arrow II in FIG. 1 according to a preferred embodiment of the present invention.
Figure 3:
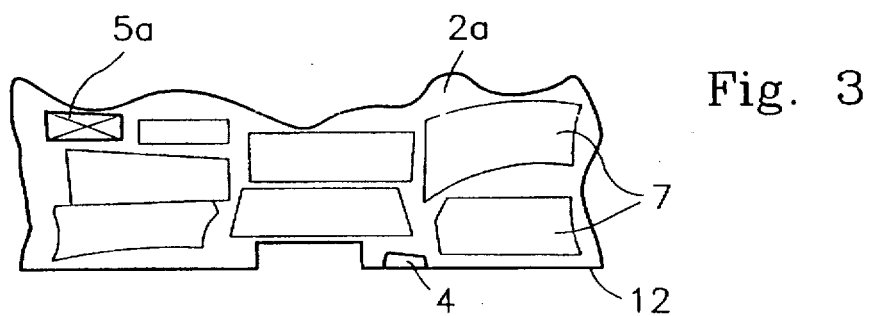
FIG. 3 shows the one half of the skin according to a preferred embodiment of the present invention.
Figure 4:
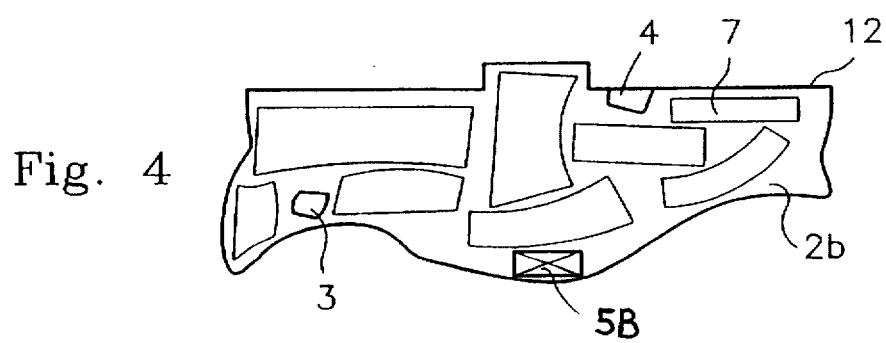
FIG. 4 shows the other half of the skin according to a preferred embodiment of the present invention.

In the computer, a dividing line 12 is determined which divides the skin 2 approximately in its center without crossing any of the parts 7 of the cutting pattern. Line 12, which in FIG. 2 extends from point A to point B and has a varying course, is projected by the projector 8 onto the animal skin 2 which lies on the table 1. At the same time, the projection of the parts 7 of the cutting pattern can be blanked out so that only the path of the dividing line 12 is projected onto the skin 2. Along this path the skin 2 is cut into two halves 2a, 2b, for example, manually by the operator with a knife.

Each half 2a, 2b has a bar code 5a, 5b associated with it. As a result thereof, the partial cutting pattern picture resulting from the total cutting pattern of the skin can be generated for each half 2a, 2b in the computer 10.

The skin halves 2a, 2b are removed from the table 1 and can either be provisionally stored or be fed to the cutting or stamping installation. Above the table of the cutting or stamping system (not shown in detail here), a camera and a projector are arranged in a manner similar to FIG. 1. They are also connected to or otherwise share information with the computer 10. The bar codes 5a, 5b of the skin halves 2a, 2b are machine-readable, so that the computer 10 can determine which skin half is placed on the table of the cutting or stamping device. By the projector, the contour of the corresponding skin halves 2a, 2b, which has been generated in the computer from the original contour line 2' and the dividing line 12, is projected onto the table. Skin halves 2a, 2b are aligned along this peripheral line by the operator.

Cutting or stamping of the parts 7 out of the corresponding skin halves 2a, 2b is then effected numerically with a CNC-controlled system which is controlled by the computer 10 and works in accordance with the associated partial cutting pattern, or is effected manually. In the event of manual cutting or stamping, the partial cutting pattern is projected by the projector onto the skin half 2a, 2b, and the operator can effect the cutting along the projected lines.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A process for cutting or stamping individual parts from an animal skin, in which the contours of the individual parts are stored in a computer and can be assembled to form a cutting pattern and, for the optimizing of the cutting, the cutting pattern is established individually as a function of the quality of the skin and projected by a projecting device onto the skin, the process comprising the steps of:

a) providing the skin with a machine-readable code;

b) detecting the contour of the skin and of the defective places contained in it by a camera and storing this information in the computer which is connected to the camera;

c) calculating the area of the skin within the contour noted;

d) displaying the contour and the defective places on a display which is connected to the computer, and establishing the individual cutting pattern;

e) associating the information detected and the cutting pattern established with the code arranged on the skin;

f) projecting the cutting pattern on the skin by a projection device;

g) dividing the skin into two pieces by a dividing cut, the course of the dividing cut being determined by the computer with consideration of the cutting pattern and being displayed via the projection device, each piece having a peripheral line comprising a part of the originally detected contour and the dividing cut;

h) projecting the peripheral line of each piece on the cutting or stamping table;

i) arranging the piece to be cut or stamped along the peripheral line projected on the cutting or stamping table; and j) cutting or stamping on the basis of the cutting pattern.

2. A process according to claim 1, wherein the established cutting pattern which is projected onto the skin is corrected interactively by an operator and the corrected cutting pattern is stored in the computer.

3. A process according to claim 1, wherein the defective places are located by an operator and marked for camera detection.

4. A process according to claim 1, wherein each skin piece is provided with a machine-readable code.

5. A process according to claim 1, wherein during the projection of the course of the dividing cut on the skin, the cutting pattern is blanked out.

6. A process according to claim 1, wherein for the coding, a bar code sticker is applied to the skin.

7. A process according to claim 4, wherein for the coding, bar code stickers are applied to each piece of the skin.

8. A process for cutting or stamping individual parts from a material, in which contours of the individual parts are stored in a computer and can be assembled to form a cutting pattern and, for the optimizing of the cutting, the cutting pattern is established individually as a function of the quality of the material and projected by a projecting device onto the material, the process comprising the steps of:

a) marking the material with machine-readable codes;

b) detecting automatically a contour of the material and of the defective places contained in it by a camera connected to the computer c) storing the detected contours as information in the computer;

d) calculating with the computer the area within the detected contours of the material;

e) displaying the contour and the defective places on a display connected to the computer;

f) establishing the individual cutting pattern;

g) associating the contour information detected and the cutting pattern established with the code marked on the material;

h) projecting the cutting pattern on the material using a projection device;

i) dividing the material into workpieces by a dividing cut, a course of the dividing cut being determined by the computer with consideration of the cutting pattern and being displayed on the display and projected via the projection device;

j) projecting a peripheral line of each workpiece, the peripheral line resulting from a part of the originally detected contour and the dividing line of the respective workpiece, on the cutting or stamping table;

k) arranging the workpiece to be cut or stamped along the peripheral line projected on the cutting or stamping table; and l) cutting or stamping the workpiece based on the cutting pattern.

9. A process according to claim 8, further comprising the steps of:

correcting the established cutting pattern which is projected onto the material interactively by an operator to obtain a corrected cutting pattern; and storing the corrected cutting pattern in the computer.

10. A process according to claim 8, further comprising the step of locating the defective places by an operator and marking the defective places for camera detection.

11. A process according to claim 8, wherein each workpiece is provided with a machine-readable code.

12. A process according to claim 8, wherein during the projection of the course of the dividing cut on the material, the cutting pattern is blanked out.

13. A process according to claim 8, wherein for the coding, a bar code sticker is applied to the material.

14. A process according to claim 11, wherein for the coding, bar code stickers are applied to each workpiece.

* * * * *

UNITED STATES PATENT AND TRADEMARK OFFICE
CERTIFICATE OF CORRECTION

PATENT NO. : 5,757,950
DATED : May 26, 1998
INVENTOR(S) : Bruder

It is certified that error appears in the above-identified patent and that said Letters Patent is hereby corrected as shown below:

On the title page, under Item No. [73] Assignee, change "Dürkoff Adler AG" to --Dürkopp Adler AG--.

Signed and Sealed this

Twenty-first Day of March, 2000

Attest:

Q. TODD DICKINSON

Attesting Officer

Commissioner of Patents and Trademarks